United States Patent
Cope (10) Patent No.: US 9,311,613 B2
(45) Date of Patent: Apr. 12, 2016

(54) OPEN SOURCE SOFTWARE DEVELOPMENT TOOLS

(71) Applicant: OpenLogic, Inc., Boulder, CO (US)

(72) Inventor: Rod Cope, Broomfield, CO (US)

(73) Assignee: OpenLogic, Inc., Broomfield, CO (US)

(*) Notice: Subject to any disclaimer, the term of this patent is extended or adjusted under 35 U.S.C. 154(b) by 0 days.

(21) Appl. No.: 14/537,624

(22) Filed: Nov. 10, 2014

(65) Prior Publication Data

US 2015/0143328 A1    May 21, 2015

Related U.S. Application Data

(63) Continuation-in-part of application No. 14/213,146, filed on Mar. 14, 2014, now abandoned.

(60) Provisional application No. 61/794,588, filed on Mar. 15, 2013.

(51) Int. Cl.
*G06Q 10/06* (2012.01)
*G06Q 10/10* (2012.01)

(52) U.S. Cl.
CPC ............ *G06Q 10/063* (2013.01); *G06Q 10/103* (2013.01)

(58) Field of Classification Search
CPC ...... G06Q 10/063; G06Q 10/103; G06Q 10/06; G06Q 10/10; G06F 8/20; G06F 8/24; G06F 8/10
USPC ......................................................... 717/102
See application file for complete search history.

(56) References Cited

U.S. PATENT DOCUMENTS

| 8,171,458 B2* | 5/2012 | Cheng et al. ................... 717/126 |
| 2006/0212464 A1* | 9/2006 | Pedersen ........................ 707/101 |
| 2007/0294179 A1* | 12/2007 | Krawetz .......................... 705/59 |
| 2010/0242028 A1* | 9/2010 | Weigert .......................... 717/131 |

* cited by examiner

*Primary Examiner* — Chameli Das
*Assistant Examiner* — Viva Miller
(74) *Attorney, Agent, or Firm* — Marsh Fischmann & Breyfogle LLP (57) ABSTRACT

Various tools for use in connection with software projects that may contain open-source software code therein. The tools may include systems and methods for improving results regarding scans of the software projects based on insight data obtained from at least one user's analysis of the results of a previous scan. The systems and methods may also include an application-specific collaboration tool.

22 Claims, 6 Drawing Sheets

| Name | Licenses in file | Confirmed Licenses | Confirmed Packages | Unconfirmed Licenses | Unconfirmed Packages | Matches |
|---|---|---|---|---|---|---|
| ../third-party-maven/com.sun.xml.messaging.saaj/saaj-impl/jars | | | | | | |
| ⊕ ☐ saaj-impl-1.3.2.jar | | Common Development and Distribution License 1.0, GNU General Public License v2.0 | SAAJ | | SAAJ | ◉ |
| ⊕ ☐ saaj-impl-1.3.jar | | Common Development and Distribution License 1.0, GNU General Public License v2.0 | SAAJ | | SAAJ | ◉ |
| ../third-party-maven/com.sun.xml.messaging.saaj/saaj-impl-1.3.2.jar!/com/sun/xml/messaging/saaj | | | | | | |
| ⊕ ☐ SOAPExceptionImpl.class | | Common Development and Distribution License 1.0, GNU General Public License v2.0 | SAAJ | | SAAJ | ◉ |
| ../third-party-maven/com.sun.xml.messaging.saaj/saaj-impl-1.3.2.jar!/com/sun/xml/messaging/saaj/client/p2p | | | | | | |
| ⊕ ☐ HttpSOAPConnection$PrivilegedGet.class | | Common Development and Distribution License 1.0, GNU General Public License v2.0 | SAAJ | | SAAJ | ◉ |
| ⊕ ☐ HttpSOAPConnection$PrivilegedPost.class | | Common Development and Distribution License 1.0, GNU General Public License v2.0 | SAAJ | | SAAJ | ◉ |
| ⊕ ☐ HttpSOAPConnection$PrivilegedSetProxyAction.class | | Common Development and Distribution License 1.0, GNU General Public License v2.0 | SAAJ | | SAAJ | ◉ |
| ⊕ ☐ HttpSOAPConnection.class | | Common Development and Distribution License 1.0, GNU General Public License v2.0 | SAAJ | | SAAJ | ◉ |
| ⊕ ☐ HttpSOAPConnectionFactory.class | | Common Development and Distribution License 1.0, GNU | SAAJ | | SAAJ | ◉ |
| Name | Licenses in file | Confirmed licenses | Confirmed packages | Unconfirmed licenses | Unconfirmed packages | Matches |

FIG. 6

OPEN SOURCE SOFTWARE DEVELOPMENT TOOLS

CROSS-REFERENCE TO RELATED APPLICATION

This application claims priority as a continuation in part application of U.S. patent application Ser. No. 14/213,146 filed on Mar. 14, 2014 entitled "OPEN SOURCE SOFTWARE DEVELOPMENT TOOLS", which claims priority from U.S. Provisional Application No. 61/794,588 filed on Mar. 15, 2013 entitled "OPEN SOURCE SOFTWARE DEVELOPMENT TOOLS," the contents of each of which are incorporated by reference herein as if set forth in full.

BACKGROUND

Conventionally, many packages of software have been formed from proprietary applications. These applications have generally been provided by a single source or by industry partners such that the applications have been developed in a coordinated way to facilitate such packaging. However, the assembly and use of such proprietary packages has generally been limited by associated licenses. More recently, open source software has grown rapidly in importance and availability. Generally, open source software is software where the source code is available for copying and modification and whose licenses generally give the user freedom to use the software for any purpose as well as to modify and redistribute the software. In this regard, open source software is distinguished from proprietary software in that the source code of proprietary software is generally not made available to the end user and the licenses for proprietary software generally place significant restrictions on use, copying, modification and redistribution. In addition, open source software is generally made available for free or for a reasonable reproduction fee whereas proprietary software is frequently provided on a for profit basis.

Open source software has a number of potential advantages for end users. First, because the source code is available to the end user and the licenses allow for substantial freedom of use and modification, the end user has significant flexibility to adapt and optimize the code for a particular endeavor. In this regard, the end user is not tied into a particular proprietary system. In addition, studies have shown that open source software tends to be of very high quality. That is, due to the open nature of the software and the opportunity for virtually unlimited peer review, the open source software is generally continually improving in quality. Moreover, because the open source software is generally available for free or at a nominal cost, there is a significant potential to use the open source software in a cost effective manner. For these and other reasons, many governments and other entities have mandated or encouraged a transition from proprietary software to open source software for systems under their control.

At the present time, however, significant obstacles remain with respect to fully realizing the potential advantages of open source software or other independently developed or uncoordinated software. For example, deficiencies in current content matching analysis methods include inefficiencies in the process of performing content matching analysis, including unreasonably lengthy analysis times, an inability to customize and/or optimize deep discovery analyses, difficulty identifying all matches, especially when interchangeable and/or nonfunctional elements have been removed or altered for the purpose of the content matching analysis, and difficulty securing or protecting the confidentiality of the user's protectable content during the course of a content matching analysis.

SUMMARY

In view of the foregoing, described herein are various systems and methods that may be utilized for improved scanning and/or searching of software projects to, for example, assist in determining, managing, and/or enforcing obligations and/or policies associated with software projects containing open source software code. Accordingly, software projects may be scanned or searched to present results that may be output to a user and/or utilized in the enforcement of policies regarding software projects.

A first aspect includes a method of analyzing a software project containing at least one open source software portion by a computer-implemented scanning tool. The method may include receiving, at a processor of the scanning tool, a project file corresponding to the software project. The project file may include at least one open source software portion. The method may also include scanning the project file to identify the at least one open source software portion in relation to a plurality of known open source software portions and generating, by the processor, a scan result in response to the scanning. The scan result may include at least one ambiguous result corresponding to a plurality of potential options identified by the processor for an association between the project file and the plurality of known open-source software portions. In turn, the method may include presenting to a user at a user interface of the scanning tool the scan result in relation to insight data based at least in part on responses to ambiguous results received in relation to previous scan results.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For example, in an embodiment, the ambiguous result may include a plurality of potential options regarding the identity of the at least one open source software portion. Further still, the ambiguous result may include a plurality of potential options regarding applicability of a license to the at least one open source software portion. The applicability of the license to the at least one open source software may depend at least in part on one or more selected from the group consisting of: usage of the project file, modification of the at least one open source software portion, or distribution of the project file.

In an embodiment, the responses to ambiguous results received in relation to previous scans may correspond to subjective decisions made by prior users in relation to previous ambiguous results. The presenting may at least partially be based on the similarity of the ambiguous results relative to the previous ambiguous results relating to prior scans of prior project files. The similarity of the ambiguous results relative to the previous ambiguous results may be at least partially based on at least one of a file name, a file path, a checksum, contents, transformed contents, or partial contents of the project file in relation to the prior project files. In an embodiment, the similarity of the ambiguous results relative to the previous ambiguous results may be used to weight the insight data in the presenting.

In an embodiment, the presenting may include displaying the plurality of potential options with at least one of highlighting visually at least one of the plurality of potential options based on the insight data or placing at least one of the plurality potential option higher in a listing of the plurality of potential options. Furthermore, in an application, the presenting may include automatically selecting the most likely option from the plurality of options based on the insight data. The automatically selecting may include implementation of a policy regarding selection a top option in a listing of the plurality of options; selecting an option that has been chosen most often in the past; or selecting an option chosen most often by users, projects, companies, or companies in industries similarly situated to the software project.

In an embodiment, the presenting may include considering the quality of the insight data in relation to the scan result. A quality of the insight data is may at least partially determined based on a company of the user, a size of the company of the user, an industry of the company of the user, previous experience of the user with the tool, previous experience of the user in the industry of the company of the user, quality of previous inputs of the user as rated by other users, or a rate of concurrence of the user relative to other users.

A second aspect includes a method for use in generating insight data in relation to results of a computer-implemented scanning tool corresponding to at least one open-source software portion in a software project. The method may include receiving, at a processor of the computer-implemented scanning tool, a project file corresponding to the software project. The project file may include at least one open source software portion. The method may also include producing, by the processor, a scan result. The scan result may include at least one ambiguous result corresponding to a plurality of potential options identified by the processor for an association between the project file and the plurality of known open source software portions. In turn, the method may include receiving, at a user interface of the computer-implemented scanning tool, an input from a human user in connection with selection, by the human user, of at least one of the plurality of options to indicate a positive association between the at least one open source software portion and a corresponding one of the plurality of known open source software portions. The method may also include generating insight data regarding the at least one ambiguous result at least partially in response to the input from the human user.

A number of feature refinements and additional features are applicable to the second aspect. These feature refinements and additional features may be used individually or in any combination. As such, each of the following features that will be discussed may be, but are not required to be, used with any other feature or combination of features of the second aspect. Furthermore, any of the features of the first aspect may also be utilized in conjunction with the second aspect.

For instance, in an embodiment, the ambiguous result may include a plurality of potential options regarding the identity of the at least one open source software portion. The ambiguous result may also include a plurality of potential options regarding applicability of a license to the at least one open source software portion. The applicability of the license to the at least one open source software may depend at least in part on one or more of usage of the project file, modification of the at least one open source software portion, or distribution of the project file. The selection of at least one of the plurality of options may correspond to a subjective decision made by the human user in relation to the at least one ambiguous result.

In an embodiment, the generating comprises associating a quality of the insight data in relation to the scan result. The quality of the insight data may be at least partially determined based on a company of the user, a size of the company of the user, an industry of the company of the user, previous experience of the user with the tool, previous experience of the user in the industry of the company of the user, quality of previous inputs of the user as rated by other users, or a rate of concurrence of the user relative to other users.

A third aspect includes a method for use in analyzing a software project comprising at least one open source software portion using a computer-implemented scanning tool. The method includes first receiving, at a processor of the computer-implemented scanning tool, a first project file corresponding to a first software project. The first project file comprises at least one open source software portion. The method may also include first producing, by the processor, a first scan result. The first scan result may include a first plurality of potential associations, identified by the processor, between the at least one open source software portion of the first software project and a plurality of known open source software portions. The first plurality of potential associations may include at least one ambiguous result. The method may also include receiving, at a user interface of the computer-implemented scanning tool, an input from a human user in connection with selection, by the human user, of at least one of the plurality of first associations to indicate a positive association between the at least one open source software portion of the first software project and a corresponding one of the plurality of known open source software portions. In turn, the method may include generating insight data regarding the at least one ambiguous result at least partially in response to the input from the human user.

The method of the third aspect may also include second receiving, at a processor of the computer-implemented scanning tool, a second project file corresponding to a second software project. The second project file may include at least one open source software portion. The method may also include second producing, by the processor, a second scan result. The second scan result may include a second plurality of potential associations, identified by the processor, between the at least one open source software portion of the second software project and a plurality of known open source software portions. The method may also include presenting to a user at a user interface of the scanning tool the second scan result in relation to the insight data.

A number of feature refinements and additional features are applicable to the third aspect. These feature refinements and additional features may be used individually or in any combination. As such, any of the foregoing features described in relation to the first and/or second aspect may be, but are not required to be, used with any other feature or combination of features of the third aspect.

A fourth aspect includes a computer-implemented scanning tool. The tool may include an insight data collection and utilization module, executed by a processor of the computer-implemented scanning tool. The insight data collection and utilization module may be operative to receive, at a user interface of the computer-implemented scanning tool, an input from a human user in connection with selection, by the human user, of at least one of the plurality of associations to indicate a positive association between the at least one open source software portion and a corresponding one of the plurality of known open source software portions. The module may further generate insight data regarding the at least one ambiguous result at least partially in response to the input from the human user. The insight data may be presented to a human user at a user interface of the scanning tool in relation to a scan result.

A fifth aspect includes a method of operation of a software scanning tool for identification of results corresponding to open-source software projects in a software project. The method may include presenting to a user results corresponding to a scan of a software project. The results may be at least partially based on open-source software code identified in the software project. The method may also include obtaining, from the user, insight data regarding one or more portions of the results. The insight data at least includes an indication of the quality of a portion of results. The method may also include utilizing the insight data in generating subsequent results corresponding to a subsequent scan of another software project.

A number of feature refinements and additional features are applicable to the fifth aspect. These feature refinements and additional features may be used individually or in any combination. As such, any of the foregoing features described in relation to the first and/or second aspect may be, but are not required to be, used with any other feature or combination of features of the fifth aspect.

For example, in an embodiment, the utilizing may include determining a level of correlation between the insight data and the subsequent scan. The level of correlation may be at least partially dependent upon overlapping identities of software portions of the software projects, overlapping functionalities the software projects, use of the software projects, and/or policies regarding the software projects. The insight data may be weighted in the utilizing operation based on the level of correlation. For example, the insight data may be weighted in the utilizing based on the user from which the insight data is received. In various applications, the insight data may be weighted based on at least one of an organization to which the user belongs, an identity of the user, an experience of the user, or a rating of the user.

In an embodiment, the insight data may include negative feedback regarding the results. In any regard, the insight data may include a subjective determination made by the user regarding the results.

The method may also include displaying the subsequent results to a user. The displaying may include providing at least one indication regarding the insight data in the subsequent results. Additionally, the presenting may include presenting results that include information based on insight data previously received from another user.

A sixth aspect includes a system for analysis of software projects. The system includes an insight data collection and utilization module operable to perform a method according to any of the foregoing aspects discussed.

A seventh aspect includes a collaboration tool for use in evaluating software projects for use of open-source software therein. The tool may include a central server and a plurality of clients executing remotely from the central server. The plurality of clients may be operable to share application-specific data with the central server, and the central server may be operable to disseminate application-specific data substantially free from graphics overhead data to others of the plurality of clients. The application-specific data may correspond to analysis of a software project with respect to the presence of open-source software code in the software project.

An eighth aspect includes a method of for use in collaboratively evaluating a software project containing at least one open source software portion. The method may include receiving, at a central server, first application-specific data from a first remote client. The first application-specific data may be at least partially obtained in response to a first input received from a first user of the first remote client corresponding to an analysis of a software project with respect to char­acteristics of at least one open source software portion open-source software portion associated with the software project. The first application-specific data is substantially free from graphics overhead data. The method may also include transmitting, from the central server, the application-specific data to a second remote client. The first remote client and the second remote client may be linked over a bidirectional operative communication channel with the central server over one or more networks.

A number of feature refinements and additional features are applicable to the eighth aspect. These feature refinements and additional features may be used individually or in any combination. As such, each of the following features that will be discussed may be, but are not required to be, used with any other feature or combination of features of the eighth aspect.

For instance, the method may include receiving, at the central server, second application-specific data from the second remote client. The second application-specific data may be at least partially obtained in response to a second input received from a second user of the second remote client corresponding to an analysis of the software project with respect to the characteristics of the at least one open-source portion associated with the software project. The second application-specific data is substantially free from graphics overhead data. The method may also include transmitting, from the central server, the second application-specific data to the first remote client. In another embodiment, the method may include configuring the first application-specific data such that the first application-specific data is transmittable through a firewall of a remote client, where the second remote client includes the firewall. In this regard, the second remote client may be free from an a priori configuration in relation to the first application-specific data.

The first application-specific data may be at least partially based on an application-specific message. The application-specific message is obtained in response to an input received from the first user of the remote client corresponding to a communication event. The communication event may be associated with a link operable to direct a second user of the second remote client to at least of one of the plurality of characteristics associated with the open-source software code. The transmitting is at least partially based on a credential associated with a second user of the second remote client.

In an embodiment, the transmitting comprises cryptographically manipulating the configured first application-specific data such that the bidirectional operative communication channel provides a secure data connection between the central server and the second remote client. In this regard, the first application-specific data may be encrypted to assist in protection of the communication.

A ninth aspect includes a system for in collaborative evaluation of a software project containing at least one open source software portion. The system includes a first remote client operative to generate first application-specific data. The first application-specific data may at least partially be obtained in response to a first input received at a first graphical user interface of the first client from a first user of the first remote client corresponding to an analysis of a software project with respect to characteristics of at least one open source software portion open-source software portion associated with the software project. The first application-specific data is substantially free from graphics overhead data related to the first graphical user interface. The system may also include a central server in operative communication with the first remote client to receive the first application specific data from the first remote client. The system may also include a second remote client operative to receive from the central server the first application-specific and generate a second graphical user interface at least in part on the first application-specific data.

BRIEF DESCRIPTION OF THE FIGURES

FIG. 6 is an embodiment of a user interface including a file listing for use in a collaborative evaluation tool.

DETAILED DESCRIPTION

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Scanning for open source is a complex undertaking due to the nature of open source software and how such software is typically implemented and licensed. For example, when scanning for a given open source file (e.g., the file 'Test.java'), a user may be interested in the identity and/or applicable licenses for each portion of open source software in a software project. This may assist in identifying open source software and/or trying to determine which open source license, if any, governs the usage of the given file. Accordingly, it may be beneficial to first determine which open source files match the given file and which open source file contents match the contents of the given file. As such, an example concerning the 'Test.java' file is utilized herein.

When many open source files from many open source projects exactly or partially match 'Test.java' or its contents, and those open source projects have multiple distinct licenses, it can be difficult to determine precisely which project and/or licenses, if any, may apply to a given usage of 'Test.java'. For example, which license applies may be at least partially based on one or more of the usage of the file, whether the file has been modified, how a file has been modified, if a file has been distributed, and how a file has been distributed, among other factors. In some cases, a reasonable research process (e.g., an automated search or scan of files) may lead to ambiguous results which a human may in turn interpret to make a subjective decision on the "best answer" as determined by the user. In this regard, the subjective decision of the user may provide insight or data that may be employed in later automated searches or scans. Accordingly, it may be beneficial to record the insight data provided by the human user (e.g., an answer) and make it available to other researchers in the future and/or integrate the insight data into the automated search or scan tool to assist in avoiding replication of human labor each time a similar situation is encountered.

As such, an embodiment of a system presented herein may present options to a user, record the final answer (which may be one of the presented options or another option provided by the user), and suggest previous answers to users facing similar decisions in the future. In this regard, insight data collected from previous analysis of the results of an automated search or scan may be integrated into future results to, for example, increase the quality of future searches and/or reduce the amount of human labor required to process the results.

In an embodiment, a system may indicate likely options by highlighting them visually, placing them higher in a list of options, or otherwise making them appear more important to users. Certain embodiments of a graphical user interface incorporating at least some of these features are presented in FIGS. 1-2, which are described in greater detail below.

In an embodiment, a system may automatically select the most likely option based on system-generated suggestions in combination with a policy. The system-generated suggestions may at least partially be based on insight data collected in response to previous scan results. Policies may include one or more directives such as select the top item in the list, select the item that has been chosen most often in the past, select the option chosen most often by users, projects, companies, or companies in industries similarly situated to the current search, select the most likely option to meet a given threshold such as, a minimum number of prior selections, a minimum or maximum amount of time since the first or last time the option was selected, etc.

In an embodiment of a system, the tool may base suggestions on the number of users coming to a particular conclusion. In this regard, the quantity of insight data collected for a particular proposition (e.g., Test.java is associated with a particular license in a particular context) may be utilized in future suggestions. In this regard, the quality of the insight data may be derived primarily based on the number of similar results.

In another embodiment, the quality of the insight data may also be considered. For instance, an embodiment of a system may at least partially base suggestions on the kinds of users coming to a particular conclusion. For instance, the kind of user may be based on the user's company, the user's company size, the user's company industry, the user's previous experience with the tool, the user's previous experience in the field, the quality of previous answers of the user have been rated by other users, the rate of concurrence of the user relative to other users, or other factors.

In an embodiment, a "similar decision" may be one in which the same file name, path, checksum, contents, transformed contents, or partial contents was scanned or matched. In this regard, when determining if and to the degree to which previously collected insight data reflects on future scans or searches, the factors used to determine a similar decision may affect which and to the degree to which previously insight data may be used. For instance, two portions of previous insight data may be weighted differently based on the degree of similarity between a given one of the portions of insight data and a current search or scan. The degree of similarity may be at least partially based on respective ones of one or more of the foregoing factors used to determine a similar decision between a previous portion of insight data and a current search or scan.

In an embodiment, a system may use insight data in the form of negative feedback to influence future suggestions. For instance, the negative feedback may cause an option to be removed from a list of results of a subsequent search or scan that are presented to users or the option may be placed lower in the list as an indication of its lower probability of correctness. For example, a user may determine that a particular option is undesirable in a given situation. As another example, the system may determine that a particular option is undesirable in a given situation merely because the user selected a different option as the best answer.

In an embodiment, the system may be configured to notify a user (or another interested party) via email or another suitable communication mechanism if the user chooses an option that meets or does not meet predetermined criteria (e.g., at least partially based on an open source software use policy). The predetermined criteria may include a list of unacceptable open source and/or non-open source packages or package versions, or a list of unacceptable open source and/or non-open source licenses or license versions. Other predetermined criteria may include standards against which each decision is compared. For example, a user or administrator may choose to have each decision compared to decisions made by other peers (e.g., other users, other companies in an industry, etc.) and notify appropriate parties when a decision is made that is significantly different from decisions made by peers when facing a similar situation.

In an embodiment of the system, the system may provide recommendations, ratings, and feedback for the various options presented to users in a results list of a search or scan based on previously collected insight data. For example, the system might display information such as "7 out of 9 users in your industry chose this answer previously". The system might also provide comments and reviews (justifications) for each suggestion (e.g., "the CTO has forbidden use of this software project", or "industry standards trend away from use of this software project"). Furthermore, the system might list reasons for rejecting or providing negative feedback for another option, recommendation, rating, or suggestion. In addition, the system may show ratings (e.g., 4 out of 5 stars) for given suggestions. The ratings may be explicitly requested from users and/or determined automatically via heuristics based on user behavior when shown said suggestions in the past.

As such, with the incorporation of insight data from previous searches or scans (e.g., that are at least indicative of a human user's subjective analysis of similar previous results), a system may be provided that provides increased quality results to future users. In this regard, the applicability and/or weight given to a given portion of insight data may be tailored based on, for example, the similarity of the source of the insight data to a future search. In any regard, a system may be provided where future search or scan results for an opens source software development tool are at least partially based on previous insight data collected from previous scans or search.

Figure 1:
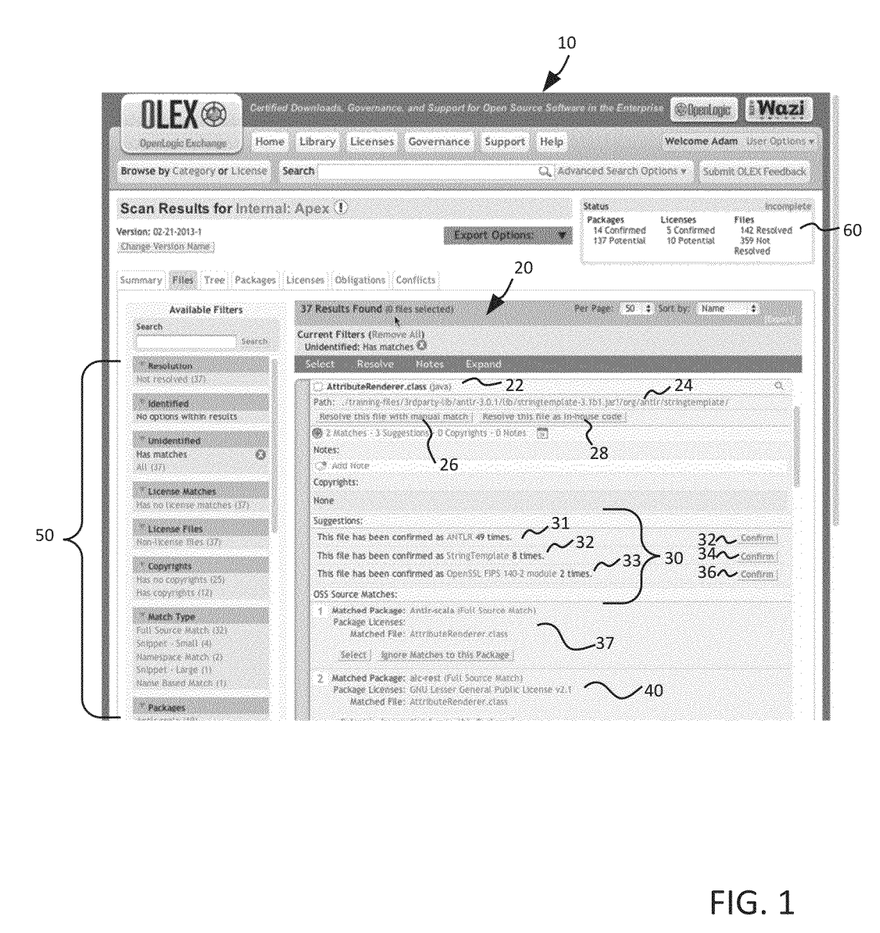
FIG. 1 illustrates a graphical user interface according to at least one embodiment described herein.

In this regard, FIG. 1 depicts a user interface 10 that may be utilized to present and/or receive insight data according to the above disclosure. The user interface 10 may include a result listing 20. The result listing 20 may include a specific file 22 identified during a scan of a software project that is identified as potentially corresponding to an open source software portion. The result listing 20 may include all such files in a given project that are identified as potentially corresponding to an open source project. In this regard, a path name 24 for a given identified file 22 may be provided. A user may also be presented with a button to allow the user to resolve the file (i.e., provide insight data) with manual matching 26 or resolve the file as an in-house (e.g., proprietary) code 28.

Additionally, the listing 20 may include a plurality of suggestions 30 regarding potential options for results identified during the scan. For instance, upon scanning a project, the file 22 may be identified as potentially corresponding to one or more known open source projects. The exact association to the project may be ambiguous. As such, those projects potentially corresponding to the file 22 comprising the ambiguous results may be displayed in the listing 20 in relation to the file 22. For example, the suggestions 30 may include an indication 31 that file 22 may be associated with a given result 31 (e.g., in this case the "ANTLR" open source project) based on the scan. Furthermore, a button 32 may be provided that allows a user reviewing the results presented in the result listing 20 to confirm that the file 22 is in fact associated with the identified potential project 31. Alternative potential projects 32 and 33 may also be listed that include corresponding buttons 34 and 36, respectively, that allow user to indicate the projects 32 and 33 correspond to the given file 22. Additionally, the number of times the file 22 has been confirmed as corresponding to the potential projects 31, 32, or 33 may be provided. As such, insight data may be presented in the form of the number of times a file similar to the file 22 has been confirmed as belonging to one of the identified potential projects 31, 32, or 33. For instance, the file 22 may have been confirmed as corresponding to the ANTLR project 31 49 times, as corresponding to the StringTemplate project 32 8 times, and as corresponding to the OpenSSL FIPS 140-2 module project 33 2 times.

In addition to the identified suggestion, the full listing of potential matches may be provided below the suggestions 30. For example, suggested potential open source matches 38 and 40 are depicted, but other potential matches may also appear in the potential matches field 37. As may be appreciated, result 38 may be identified as potentially corresponding with the file 22. Furthermore, the potential projects 31, 32, and 33 identified in the suggestions 30 may also appear in the listing of potential matches (e.g., the project 31 corresponds to result 38 as shown). In this regard, more projects may appear in the potential matches 37 than appears in the suggestions 30. In this regard, the potential open source matches 38 and 40 in the potential matches field 37 may provide the user information such as the package name, an indication of the nature of the match, a license associated with the package, a file to which the package matches, or other information. The user may be presented with a button that allows the user to select or ignore matches to the particular software package provided.

The user may also be presented with a filter menu 50 that allows for the results listing 20 to be filtered in a number of different respects. Further still, a summary window 60 may be provided that indicates the number of confirmed and/or potential packages identified in a scan, the number of licenses that are confirmed and/or potentially identified in a scan, as well as the number of files that have been resolved and/or not resolved in the project which is being scanned.

Figure 2:
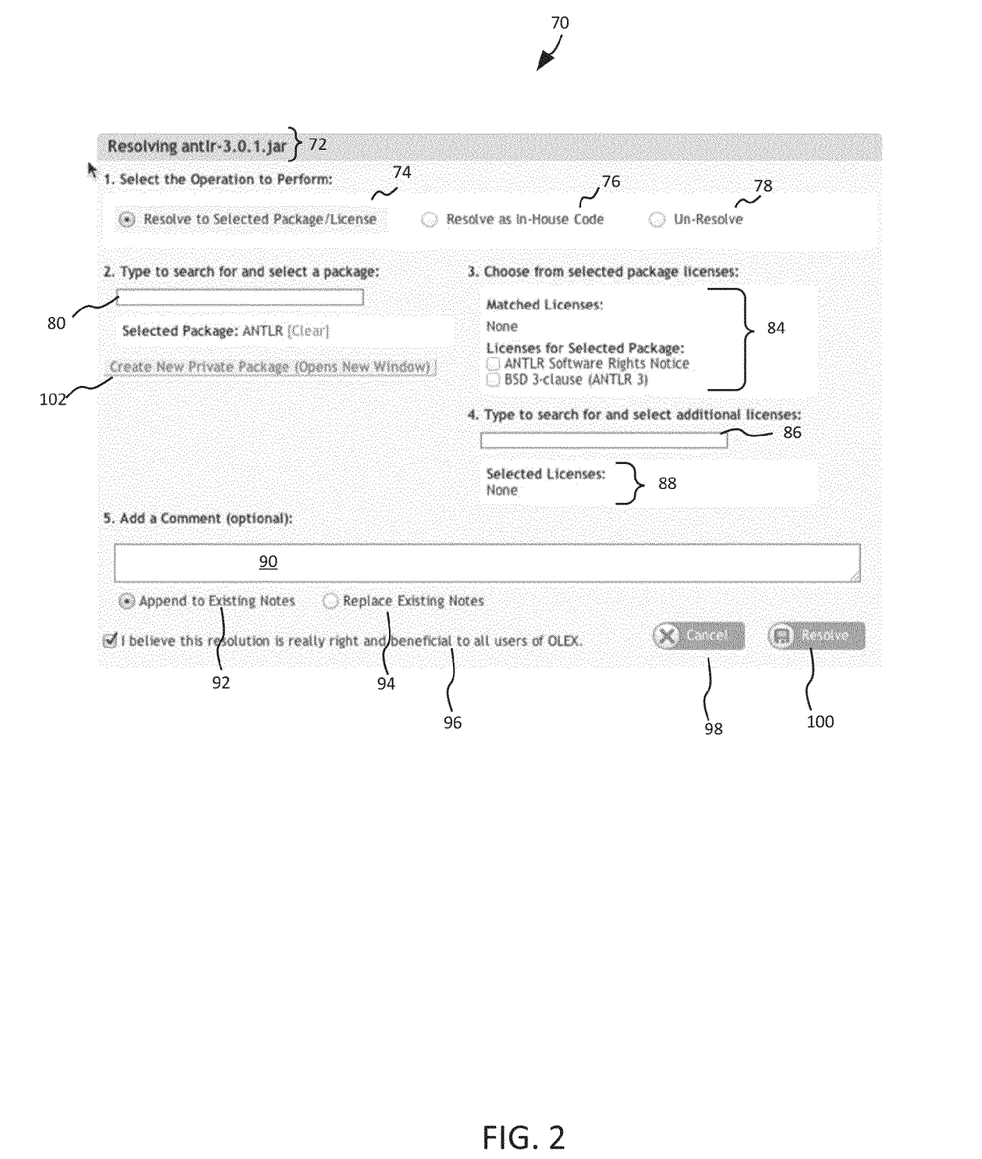
FIG. 2 illustrates a graphical user interface according to at least one embodiment described herein.

FIG. 2 depicts a further user interface 70 that may allow for specific resolution with respect to a given file 72. In this regard, the file 72 may be listed in the heading of the user interface 70. Furthermore, options may be provided with respect whether the user intends to: resolve the selected file 72 in accord with the selections in the user interface 70 at 74, resolve the selected package 72 as in-house (e.g., proprietary) code at 76, or un-resolve a previously provided resolution for the selected package 72 at 78 are provided to the user. Furthermore, a search field 80 may be provided that allows a user to search for a selected package to associate with the selected file 72.

A given selected package(s) to be associated with the file 72 may be displayed at 82. In this regard, a common resolution of a plurality of packages to a given file 72 may be facilitated. The selected packages 82 to be associated with the file 72 may also be provided by selection of the select button in a given listing 20 for the selected file 72 (e.g., by selecting the "Select" button for a potential match as shown with respect to package 38 and 40 in FIG. 1). A user may also have the option to create a new private package by selection the button 102.

For the given selected package 82 associated with the file 72, the user may be operable to select a given license for the selected package 82 by selecting a potentially applicable license listed in the license selection portion 84 (e.g., corresponding with identified potential licenses as a result of a search). The user may also provide an indication of a given license that is not listed in the selection portion 84 for the selected package 82 in an input field 86. In this regard, licenses applying to the selected file 72 and/or package 82 associated with the file 72 may be listed in the license listing 88. The user may further provide additional comments in the comment field 90. These comments 90 may be appended to existing notes at 92 or be designated to replace existing notes at 94.

Furthermore, the user may be allowed to input an indication of the confidence of a user in relation to the information provided in relation to resolution of the file 72. For example, the user may select the indication 96 indicating they believe the resolution provided in the user interface 70 for the given file 72 is correct and would be beneficial to other users. Absent the selection, the resolution provided may not be included in later insight data presented to other users. Selection of the cancel button 98 may result in the cancellation of the operation, whereas selection of the resolve button 100 may save the provided resolution for a given package 82.

As described above, open source scanning and determining which potential open source packages or licenses are "correct" is a difficult process that may require significant human analysis (e.g., subjective determinations of the perceived "best answer" or "correct result"). As such, the process may require collaboration among multiple people familiar with the field and/or the software being scanned. To facilitate this resolution process, a collaborative evaluation tool may be provided that makes it easy for any number of people to coordinate and collaborate on the results of a single scan concurrently from any location.

For example, in an embodiment, a plurality of users may join a collaboration session using only a web browser from anywhere in the world with Internet access. In this regard, each user may utilize the web browser to communicate with a central server that may coordinate the collaboration session. As such, this system may facilitate a collaboration session more efficiently than traditional screen sharing technologies that may require installation of client software and may include problems accurately sharing data among users working on multiple disparate operating systems and/or at suboptimal internet connections.

For example, traditional screen sharing technologies generally send visual representations of the screen among clients. In this regard, there may be much "overhead" data corresponding to the visual data corresponding to the screen shot that is not substantively related to the project or system being analyzed in the collaboration session. For instance, the specific graphical representation of a user's graphical user interface may provide little to no value to another user of the collaboration session. Rather, the users of the collaboration session may only desire to receive the information associated with the substantive discussion of the collaboration session.

Accordingly, in an embodiment of a tool, the collaborative evaluation tool may only send application-specific data, thus saving significant bandwidth and increasing performance, especially for distant participants with limited or low quality Internet connections. Thus, rather than transmitting graphical user interface data between a plurality of clients, the present system may include communicating application-specific data to a central server. Each user of the collaboration session may access the central server and receive the shared application-specific data. Thus, rather than receiving the low-value, bandwidth intensive graphical user interface data normally shared during screen sharing, only relevant application-specific data may be shared.

In addition, the implementation allows collaboration among participants inside and outside of any number of disparate corporate or other firewalls without special a priori configuration. That is, given the nature of the browser access rather than high overhead transfer of data to a client machine resident application, the sharing of application-specific data may not only be lightweight, but may allow for use even behind corporate firewalls or the like.

Furthermore, in an embodiment, the system allows users to be notified when other users join a collaboration session. As such, the system may facilitate collaboration between users in real time (e.g., via application-specific instant messages). Application-specific instant messages may be similar to generic instant messages in that they contain text and are delivered quickly over the Internet (e.g., in a browser based central server access context). However, the application-specific instant messages may be tailored to the open source scanning and resolution process to make the communication more effective. For example, instead of sending a simple message such as "look at the contents of file 621,327,249 in the /my/application/path/archive directory, then scroll down to line 7,321", the message may simply say "look at this match ==>" where the arrow may be provided as a clickable link in the messages window that navigates the user to the desired location. That is, the instant-message may link to application-specific data (e.g., a specific location in the project). The message may be created by the sending user simply by clicking a link in the user interface and then choosing the desired recipients.

In this regard, an implementation may support context sharing. Context sharing may allow one user to share all pertinent information about a given portion of context with one or more other users. Context may include the directory or directories currently being examined, any filters applied (e.g., files with a certain extension, files that have or have not yet been resolved, files with or without matches, files with certain open source license(s), files with paths and/or files names that match or don't match a given search string, and the like), which files are selected, the configuration of the user interface (e.g., locations of various windows and panels, the number of items and which columns to show in various tables, the arrangement and sorting of filters, which areas of the screen are expanded or collapsed, and so on), and other settings (e.g., how to respond to clicks of certain user interface elements, whether to update certain calculations immediately or in batches, and so forth). In this regard, the context may be provided from a user to a central server. Upon access of the central server by other users, the central server may disseminate the context appropriately (e.g., in a lightweight instant message as described above).

Furthermore, an implementation may support file sharing. File sharing may allow one user to "share" file details (e.g., a Quick Match View of a file, or a Code Compare of a file) with other participants without actually sending any file data directly to them. Instead, the implementation may the other participants' browsers to perform the desired action against the chosen file (or files). The other user's browsers may then display the required information either from local caches stored at the user's machine or by requesting the applicable data from the scanning server. This mechanism may facilitate shared information between users on either side of a corporate firewall without special, a priori configuration in view of the firewall. It may also optimizes the use of bandwidth by each participant by allowing each of them to download data from the scanning server and not have to upload data directly to other participants.

As such, one implementation includes a "follow me" feature. The "follow me" feature may allow a leader to share every action with one or more remote participants who can follow along in real-time. To initiate this mode, the leader may send an invitation to the desired followers via application-specific messaging. Participants may also have the ability to ask the leader to join a "follow me" session either already started or not yet started, depending on their permissions and relationship with the leader (e.g., the requester may need to work in the same department as the leader or meet some other policy-based criteria to be eligible). Once initiated, each significant click and action taken by the leader (e.g., where significant is determined by the application and may relate only to substantive application details rather than, for instance, graphical user interface settings) is transmitted to the followers via the central server. With this mechanism, it may be easy to coordinate, collaborate, train, and demonstrate to multiple participants whether they are physically in the same room or on another continent.

Further still, the "follow me" feature may be adapted to provide remote user support. In particular, experts in the field of open source scanning and resolution may participate efficiently in the resolution process with newer and less sophisticated users as well as other experts who want a second opinion. The implementation may also allow participants working for multiple companies to work together securely on sensitive questions regarding intellectual property. For instance, certain data may be restricted, encrypted, obfuscated, or otherwise limited for access by certain users (e.g., users outside a corporation). For instance, industry standard security techniques to encrypt and/or obfuscate communication channels among the participants and/or communication between the scanning server and each individual participant or any combination thereof may be utilized. Further still, local policy may at least partially determine limitations on collaboration. For instance, participants may have different rights when collaborating. For example, some users may have read-only access to the data while others may have the ability to perform certain actions (such as accepting a pre-existing resolution suggestion), but not others (such as manually entering a resolution option not automatically presented by the system). An another example, some users may have only administrative rights, such as creating and managing users in the system and determining which users under their administrative control are eligible to work on which projects or scans. In yet another example, some users may only have the ability to see generated reports either during or after the resolution process is complete.

In an embodiment, the system may support sending and receiving messages to and from a single participant, a group of participants, all participants currently working on a given scan, all participants eligible to work on a given scan, and/or all participants currently working on any scan. Furthermore, each of these groups may be filtered, either manually or automatically, to include or exclude any or all groups, teams, departments, divisions, companies, and/or industries.

Figure 3:
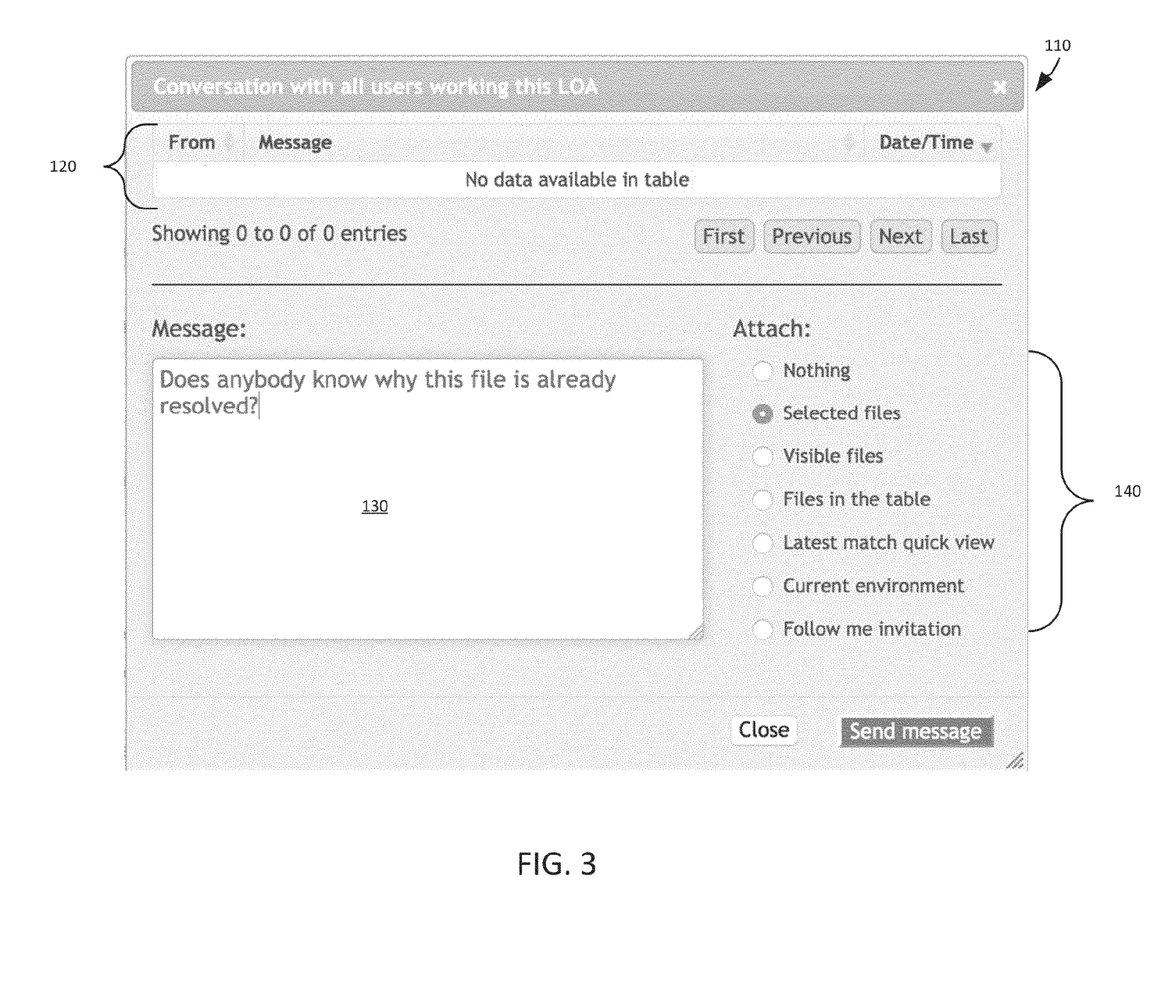
FIGS. 3-5 are embodiments of screenshots of a user interface of a collaborative evaluation tool.

For example, FIG. 3 depicts an embodiment of a user interface 110 that may be presented to a user of the collaborative evaluation tool to perform functionality described above. In this regard, the user interface 110 may include a message history field 120 that depicts previous instances of messages in a given conversation between users of the tool. The user interface 110 may also include a message body field 130 that allows a user to compose messages that may be provided to other users of the tool. Furthermore, an attachment selection 140 may provided that allows a user to provide an attachment (or reference) along with the message sent to other users of the tool that may be, for example, referenced by the message compose in the message field 130.

In this regard, with reference to FIG. 3, a user may provide a message in the message field 130 requesting other users provide information regarding whether a given particular file of a software project has been resolved. In turn, the user may select corresponding selected files in the attachment selection 140. In this regard, when the user chooses to send the message, the message text compose in the message body field 130 may be sent along with application-specific data to a central server for distribution other users of the tool. Notably, the selected files referenced in the attachment selection 140 may already be resident at the user locations to which the messages sent. In this regard, the information provided by the message to the central server may only include the message text compose the message body field 130 and an indication of the selected files referenced in the attachment selection 140.

Figure 4:
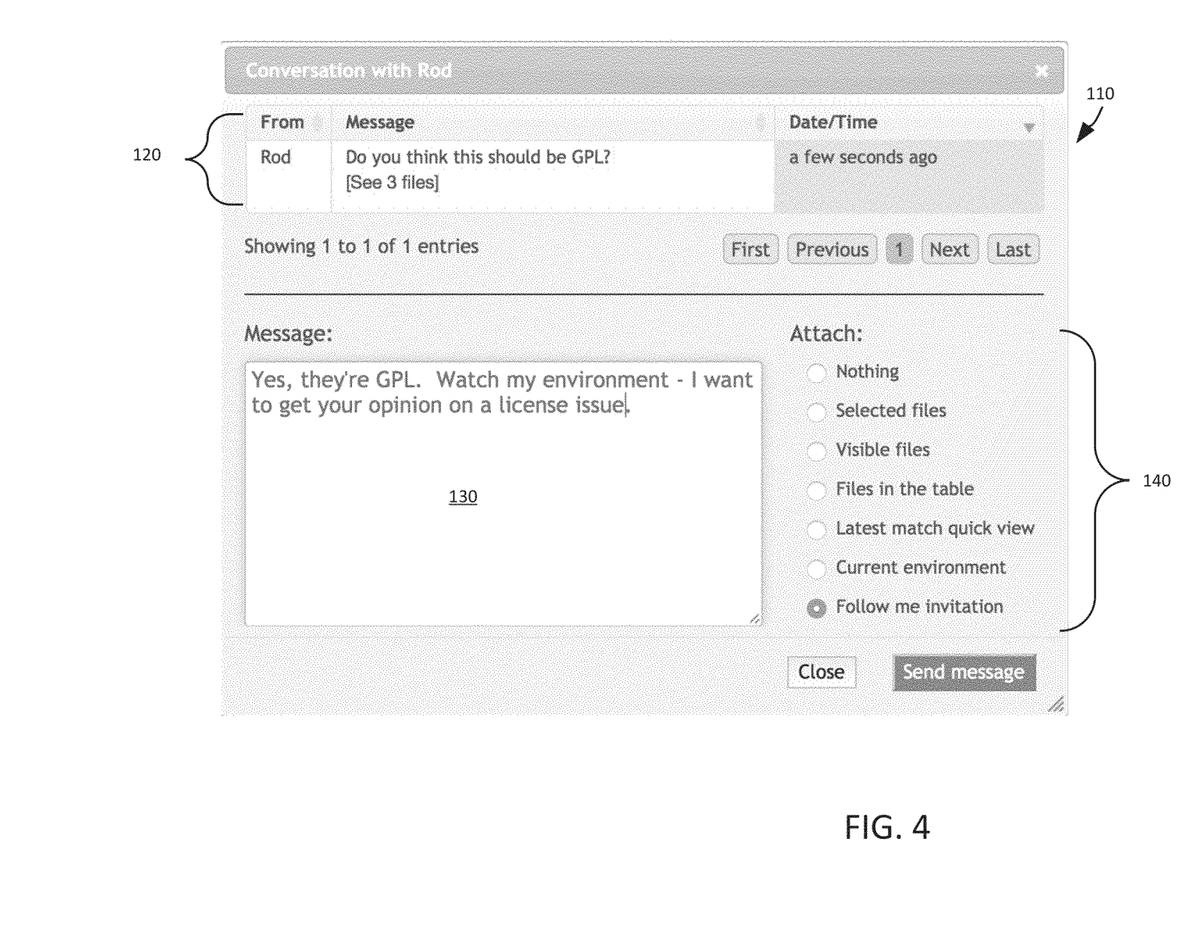
Figure 5:
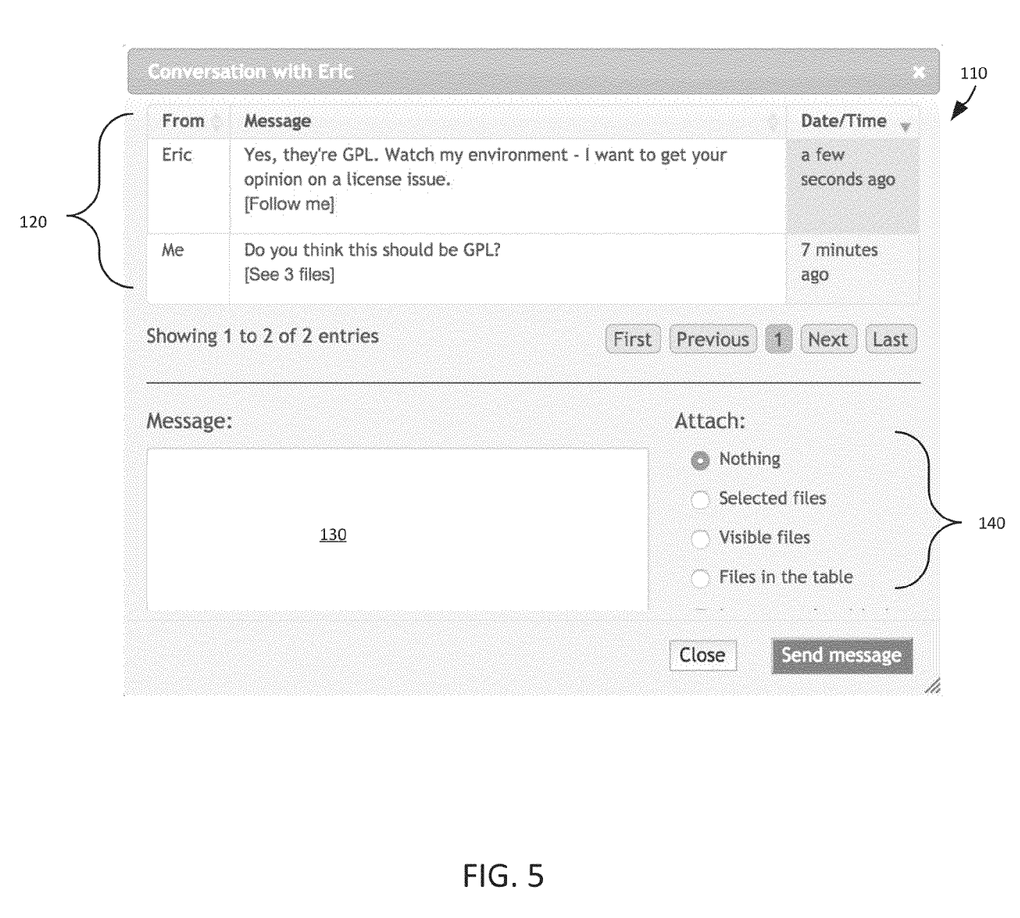

In this regard, a series of messages are depicted in FIGS. 4 and 5 in relation to the user interface 110 as may be utilized by users to resolve a given file. For instance in FIG. 4, the message history field 120 indicates that a message has been received regarding a particular question for number files. Specifically, a first user asks, "Do you think this should be GPL?" and references three files selected by way of the attachment selection 140. In this regard, the second user who receives the message from the user who posed the question may review the files referenced in the attachment. Specifically, the actual files may not be transmitted along with the message, but rather as both users may have instances of the project available, a reference pointer to the particular files within the project may be utilized to allow the second user receiving the message to review the files. In turn, the second user may provide a response in the message body field 130 indicating an answer to the question posed by the first user. Furthermore, the second user may also have an issue that they requesting assistance with from the first user. In this regard, the second user may select from the attachment selection 140 a follow me invitation that provides application-specific data regarding the information viewed by the second user to the first user to assist in the first user providing insight to the second user regarding the particular issue in question. However, the communication between the first two and the second user may be application-specific data free from graphics overhead data. In this regard, rather than providing a screen share that provides all graphics information for the second user, specific application-specific data regarding the information with respect to the software package the second user is accessing or viewing may be provided to the first user to allow the first user to follow along and provide insight to the second user as they diagnose the problem. With further reference to FIG. 5, the first user may receive the message from the second user in the message history field 120 and allow the second user to track the actions of the first user with respect to the specific project being analyzed.

Furthermore, FIG. 6 provides a example of a listing 150 for given files in a project that may include also information regarding confirmed licenses 152, confirm software packages 154, unconfirmed licenses 156, unconfirmed packages 158, licenses identified as belonging to the package 160, or other information. In this regard, the listing 150 may be accessed by a plurality of users of the tool to assist in resolution of various files. Furthermore, the listing 150 may be used to reference given files to be resolved using the user interface 110 of the tool.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences).

Accordingly, it should be understood that only the preferred embodiment and variants thereof have been shown and described and that all changes and modifications that come within the spirit of the invention are desired to be protected.

What is claimed is:

1. A method of analyzing a software project containing at least one open source software portion by a computer-implemented scanning tool, the method comprising:
   receiving, at a processor of the scanning tool, a project file corresponding to the software project, wherein the project file comprises at least one open source software portion;
   scanning the project file to identify the at least one open source software portion in relation to a plurality of known open source software portions;
   generating, by the processor, a scan result in response to the scanning, wherein the scan result comprises at least one ambiguous result corresponding to a plurality of potential options identified by the processor for an association between the project file and the plurality of known open-source software portions; and
   presenting to a user at a user interface of the scanning tool the scan result in relation to insight data regarding the at least one ambiguous result of the scan result based at least in part on responses to ambiguous results received from other users in relation to previous scan results presented to the other users.

2. The method of claim 1, wherein the ambiguous result comprises a plurality of potential options regarding the identity of the at least one open source software portion.

3. The method of claim 1, wherein the ambiguous result comprises a plurality of potential options regarding applicability of a license to the at least one open source software portion.

4. The method of claim 3, wherein the applicability of the license to the at least one open source software depends at least in part on one or more selected from the group consisting of: usage of the project file, modification of the at least one open source software portion, or distribution of the project file.

5. The method of claim 1, wherein the responses to ambiguous results received in relation to previous scans correspond to subjective decisions made by prior users in relation to previous ambiguous results.

6. The method of claim 5, wherein the presenting is at least partially based on the similarity of the ambiguous results relative to the previous ambiguous results relating to prior scans of prior project files.

7. The method of claim 6, wherein the similarity of the ambiguous results relative to the previous ambiguous results is at least partially based on at least one of a file name, a file path, a checksum, contents, transformed contents, or partial contents of the project file in relation to the prior project files.

8. The method of claim 7, wherein the similarity of the ambiguous results relative to the previous ambiguous results is used to weight the insight data in the presenting.

9. The method of claim 1, wherein the presenting comprises displaying the plurality of potential options with at least one of highlighting visually at least one of the plurality of potential options based on the insight data or placing at least one of the plurality potential option higher in a listing of the plurality of potential options.

10. The method of claim 1, wherein the presenting comprises automatically selecting the most likely option from the plurality of options based on the insight data.

11. The method of claim 10, wherein the automatically selecting comprises implementation of a policy regarding selection a top option in a listing of the plurality of options; selecting an option that has been chosen most often in the past; or selecting an option chosen most often by users, projects, companies, or companies in industries similarly situated to the software project.

12. The method of claim 1, wherein the presenting comprises considering the quality of the insight data in relation to the scan result.

13. The method of claim 12, wherein a quality of the insight data is at least partially determined based on a company of the user, a size of the company of the user, an industry of the company of the user, previous experience of the user with the tool, previous experience of the user in the industry of the company of the user, quality of previous inputs of the user as rated by other users, or a rate of concurrence of the user relative to other users.

14. A method for use in generating insight data in relation to results of a computer-implemented scanning tool corresponding to at least one open-source software portion in a software project, the method comprising:
   receiving, at a processor of the computer-implemented scanning tool, a project file corresponding to the software project, wherein the project file comprises at least one open source software portion;
   producing, by the processor, a scan result, wherein the scan result comprises at least one ambiguous result corresponding to a plurality of potential options identified by the processor for an association between the project file and a plurality of known open source software portions; and
   receiving, at a user interface of the computer-implemented scanning tool, an input from a human user in connection with selection, by the human user, of at least one of the plurality of potential options to indicate a positive association between the at least one open source software portion and a corresponding one of the plurality of known open source software portions;
   generating insight data regarding the at least one ambiguous result at least partially in response to the input from the human user for use in relation to subsequent search results.

15. The method of claim 14, wherein the ambiguous result comprises a plurality of potential options regarding the identity of the at least one open source software portion.

16. The method of claim 14, wherein the ambiguous result comprises a plurality of potential options regarding applicability of a license to the at least one open source software portion.

17. The method of claim 16, wherein the applicability of the license to the at least one open source software depends at least in part on one or more of usage of the project file, modification of the at least one open source software portion, or distribution of the project file.

18. The method of claim 14, wherein the selection of at least one of the plurality of options corresponds to a subjective decision made by the human user in relation to the at least one ambiguous result.

19. The method of claim 14, wherein the generating comprises associating a quality of the insight data in relation to the scan result.

20. The method of claim 19, wherein the quality of the insight data is at least partially determined based on a company of the user, a size of the company of the user, an industry of the company of the user, previous experience of the user with the tool, previous experience of the user in the industry of the company of the user, quality of previous inputs of the user as rated by other users, or a rate of concurrence of the user relative to other users.

21. A method for use in analyzing a software project comprising at least one open source software portion using a computer-implemented scanning tool, the method comprising:

first receiving, at a processor of the computer-implemented scanning tool, a first project file corresponding to a first software project, wherein the first project file comprises at least one open source software portion;

first producing, by the processor, a first scan result, wherein the first scan result comprises a first plurality of potential associations, identified by the processor, between the at least one open source software portion of the first software project and a plurality of known open source software portions, and wherein the first plurality of potential associations comprise a first ambiguous result; and receiving, at a user interface of the computer-implemented scanning tool, an input from a first human user in connection with selection, by the first human user, of at least one of the plurality of first associations to indicate a positive association between the at least one open source software portion of the first software project and a corresponding one of the plurality of known open source software portions;

generating insight data regarding the first ambiguous result at least partially in response to the input from the first human user;

second receiving, at a processor of the computer-implemented scanning tool, a second project file corresponding to a second software project, wherein the second project file comprises at least one open source software portion;

second producing, by the processor, a second scan result, wherein the second scan result comprises a second plurality of potential associations, identified by the processor, between the at least one open source software portion of the second software project and a plurality of known open source software portions, wherein the second plurality of potential associations comprise a second ambiguous result; and presenting to a second user at a user interface of the scanning tool the second scan result in relation to the insight data regarding the second ambiguous result.

22. A computer-implemented scanning tool, comprising:

an insight data collection and utilization module, executed by a processor of the computer-implemented scanning tool, that is operative to receive, at a user interface of the computer-implemented scanning tool, an input from a first human user in connection with selection, by the first human user, of at least one of the plurality of associations to indicate a positive association between the at least one open source software portion and a corresponding one of the plurality of known open source software portions and generate insight data regarding the at least one ambiguous result at least partially in response to the input from the first human user;

wherein the insight data is presented to a second human user at a user interface of the scanning tool in relation to a scan result having an ambiguous result.

* * * * *